US007001957B2

(12) United States Patent
McBride

(10) Patent No.: US 7,001,957 B2
(45) Date of Patent: Feb. 21, 2006

(54) METHOD OF MANUFACTURING CURED ETHYLENE ACRYLIC AND POLYACRYLATE ELASTOMERS

(75) Inventor: Edward McBride, Wilmington, DE (US)

(73) Assignee: E.I. du Pont de Nemours and Company, Inc., Wilm., DE (US)

( * ) Notice: Subject to any disclaimer, the term of this patent is extended or adjusted under 35 U.S.C. 154(b) by 96 days.

(21) Appl. No.: 10/417,806

(22) Filed: Apr. 17, 2003

(65) Prior Publication Data

US 2003/0204025 A1 Oct. 30, 2003

Related U.S. Application Data

(60) Provisional application No. 60/376,778, filed on Apr. 29, 2002.

(51) Int. Cl.
*C08F 8/32* (2006.01)
*C08L 3/36* (2006.01)
*C01B 33/12* (2006.01)

(52) U.S. Cl. ............... 525/379; 524/495; 524/560; 524/561; 524/492; 428/335; 428/364

(58) Field of Classification Search ............... 525/379, 525/382, 374, 539, 452; 524/495, 492, 253, 524/252; 428/335, 364; 502/407, 509
See application file for complete search history.

(56) References Cited

U.S. PATENT DOCUMENTS

| 3,883,472 | A | * | 5/1975 | Greene et al. | ............... | 524/151 |
| 3,904,588 | A | * | 9/1975 | Greene | .................... | 525/329.6 |
| 4,026,851 | A | | 5/1977 | Greene | | |
| 4,141,857 | A | * | 2/1979 | Levy et al. | .................. | 502/439 |
| 4,399,263 | A | * | 8/1983 | Brodoway | ................... | 525/382 |
| 4,412,043 | A | | 10/1983 | Pazos | | |
| 4,464,203 | A | * | 8/1984 | Belde et al. | ................ | 106/413 |
| 2002/0004568 | A1 | | 1/2002 | Cohen et al. | | |

FOREIGN PATENT DOCUMENTS

| JP | 56-24436 A | * | 3/1981 |
| JP | 200044757 A | | 2/2000 |

OTHER PUBLICATIONS

Aldrich Catalog (1998-1999) p. 884.*
JP 56-24436 (abstract in English).*
SU 705535 (Jan. 10, 1979, abstract in English).*
SU 664468 (Jul. 10, 1981, abstract in English).*
RD 165019 (Jan. 10, 1978, abstract).*
Paul E. Manley, Ph.D., et al., Improved Heat & Compression Set Resistant Polyacrylate Elastomers—Part B: Applications in Engine and Automatic Transmission Fluids Requiring Low Compressive Stress Relaxation, Presented at the 158th meeting of the Rubber Division, American Chemical Society, Cincinnati, OH, Oct. 17-20, 2000, Paper No. 127.
Isao Kubota, et al., Improved Heat & Compression Set Resistance Polyacrylate Elastomers Part A Polymer Development, Presented at a meeting of the Rubber Division, American Chemical Society, Cincinnati, Ohio, Oct. 17-20, 2000, Paper No. 126.
Isao Kubota, et al., Improved Low-Temperature Properties Polyacrylate Elastomers, Presented at the 160th technical meeting of the Rubber Division, American Chemical Society, Cleveland, Ohio, Oct. 16-19, 2001, Paper No. 32.
Robert D. Demarco, et al., Polyacrylic Elastomers, Hy Temp, Zeon Chemicals Incorporated, Louisville, KY, PA 0901.1-PA 0901.20 and references pp. 1-3.

* cited by examiner

*Primary Examiner*—David W. Wu
*Assistant Examiner*—Rip A Lee

(57) ABSTRACT

An improved method of making an ethylene acrylate (AEM) elastomer or a polyacrylate (ACM) elastomer wherein an aqueous solution of hexamethylene diamine (HMDA) is employed as the curative agent rather than hexamethylene diamine carbamate (HMDAC). The HMDA reacts with the curative-site monomer derived from the monoalkyl ester of a 1,4-butene-dioic acid in the presence of water, producing (i.e., after press-curing and any secondary heat-curing) a crosslinked elastomer with properties essentially indistinguishable from that produced using HMDAC as the curative agent. Advantageously, the aqueous solution of HMDA can be blended directly into the compound or it can be deposited on an additive such as silica or carbon black prior to blending. Elastomers produced by the improved method according to the present invention are particularly useful in automotive applications requiring oil resistant compositions.

19 Claims, No Drawings

METHOD OF MANUFACTURING CURED ETHYLENE ACRYLIC AND POLYACRYLATE ELASTOMERS

CROSS-REFERENCE TO RELATED APPLICATIONS

Applicant claims the benefit of priority to provisional application No. 60/376,778 filed Apr. 29, 2002; herein incorporated by reference in its entirety.

BACKGROUND OF THE INVENTION

1. Field of the Invention

The present invention relates to a method of manufacturing cured (i.e., crosslinked) ethylene acrylate elastomer or polyacrylate elastomer. More specifically, the present invention relates to the use of an aqueous solution of hexamethylene diamine (HMDA) as a curative agent for ethylene/alkyl acrylate copolymer and poly(alkyl acrylate) copolymer containing a mono alkyl ester cure-site termonomer.

2. Description of the Related Art

It is generally known in the art to cure a terpolymer of ethylene, an alkyl acrylate, and a mono alkyl ester cure-site monomer with hexamethylene diamine carbamate (HMDAC) to produce vulcanized elastomer. The resulting ethylene acrylate elastomers exhibit a combination of mechanical toughness, low brittle point, low oil swell, and a high level of heat aging resistance that is particularly conducive to certain commercial automotive applications. For example, U.S. Pat. No. 3,904,588 describes and claims the curing of random copolymer derived from the polymerization of ethylene, an alkyl acrylate (e.g., methyl and ethyl acrylate) and a monoester of maleic acid (e.g., methyl, ethyl, and propyl 1,4-butene-dioic acid). This reference discloses and claims the use of 1.5 parts of HMDAC per 100 parts by weight of the terpolymer containing the mono ester cure-site monomer along with other ingredients being blended on a roll mill followed by a press-curing step for 30 minutes at 180° C. at a total pressure of about 40,000 psig. The reference teaches that hexamethylene diamine can be used as the vulcanizing agent but does not teach the use of an aqueous solution of HMDA.

In a companion U.S. Pat. No. 3,883,472 filed on the same day, an elastomeric composition having good scorch resistance is taught involving an acrylic ester/butenedioic acid monoester dipolymer or an ethylene/acrylic ester/butene-dioic acid monoester terpolymer which is crosslinked with a vulcanizing agent and at least one vulcanization accelerator. Hexamethylene diamine carbamate, tetramethylenepentamine (TEPA), and hexamethylene diamine are employed as the curing agent during vulcanization. However, there is again no disclosure of the use of an aqueous solution of HMDA. Similarly, it is also generally known that polyacrylate elastomers typically involving two or more alkyl acrylates (e.g., ethyl acrylate, butyl acrylate and 2-methoxyethyl acrylate) copolymerized with a small amount of butene dioic acid monoalkyl ester cure-site termonomer can be crosslinked during curing by the use of various diamines such as HMDA and HMDAC, see for example Japanese patent application JP 2000-44757.

In U.S. Pat. No. 4,412,043 an elastomeric composition derived from an ethylene/methyl or ethyl (meth)acrylate copolymer having a third cure-site involving 4-(dialkylamino)-4-oxo-2-butenoic acid termonomer is taught by employing a diamine curing agent. Again HMDA is identified as an alternative to HMDAC but no disclosure of the use of an aqueous solution of HMDA is present.

In U.S. Pat. No. 4,026,851, the use of an aqueous 88% hexamethylene diamine solution is employed as a curing agent for curing a polyacrylate, ethylene/acrylate copolymer or ethylene/acrylate/methacrylate terpolymer wherein no monoester cure-site monomer is present.

The problem with the above methodology for curing is that HMDAC is a relatively expensive crosslinking agent and even though it is a minor constituent it represents a significant cost and HMDA is relatively corrosive and difficult to handle with a melt/freeze point of about 40° C. As such, an alternate methodology and low cost alternative crosslinking agent would be potentially advantageous.

BRIEF SUMMARY OF THE INVENTION

In view of the above-mentioned problems, it has now been discovered that an aqueous solution of HMDA can advantageously be used as the curative agent to crosslink both ethylene acrylate (AEM) type elastomer and polyacrylate (ACM) type elastomer having small amounts of butene dioic acid monoalkyl ester cure-site monomer present. It has now been discovered that even in the presence of the water of solution the conventional press-curing and secondary heat-curing steps produce elastomer properties essentially indistinguishable from those resulting from the use of HMDAC as the curative agent. Conveniently, commercially available HMDA aqueous solution (typically at about 70/30 weight ratio) can be employed as a substitute for HMDAC to be blended directly with the gum rubber copolymer, or such a solution can be mixed with and/or deposited on an additional additive such as carbon black, silica, di-ortho-tolyl guanidine (DOTG) or the like prior to blending with the polymer.

Thus the present invention provides in a process for making a crosslinked ethylene acrylate elastomer or a polyacrylate elastomer involving the steps of blending a curative agent with an ethylene/alkyl acrylate copolymer containing a monoalkyl ester of a 1,4-butene-dioic acid cure-site termonomer or with a polyacrylate copolymer containing a monoalkyl ester of a 1,4-butene-dioic acid cure-site termonomer and optionally other additives and then press-curing at elevated temperature and elevated pressure for sufficient time to crosslink the copolymer followed by an optional post-cure heating at ambient pressure to further cure the elastomer, the specific improvement comprising the step of blending an aqueous solution of hexamethylene diamine with the copolymer as the curative agent. The present invention further provides an improved process as described above wherein the aqueous solution of HMDA and water is converted to a dry liquid concentrate before it is added to the mixer. The dry liquid concentrate can be made from several different fillers including carbon black, fumed silica, precipitated silica or other mineral fillers. Preferably the additive to which the aqueous solution is added prior to blending with the copolymer is carbon black or silica.

DETAILED DESCRIPTION OF THE INVENTION

In this disclosure, the term "copolymer" is used to refer to polymers containing two or more monomers. The use of the term terpolymer and/or termonomer means that the copolymer has at least three different comonomers. "Consisting essentially of" means that the recited components are essential, while smaller amounts of other components may be present to the extent that they do not detract from the operability of the present invention. The term "(meth)acrylic acid" refer to methacrylic acid and/or acrylic acid, inclusively. Likewise, the term "(meth) acrylate" means methacrylate and/or acrylate.

Ethylene acrylate (AEM) elastomers and polyacrylate (ACM) elastomers having small amounts of a butene dioic acid monoalkyl ester cure-site monomer present are widely used in the automotive industry because of their excellent resistance to lubricating oils and greases, heat and compression set resistance, mechanical toughness and low brittle point. As such, they are well suited for gaskets and seals, various types of automotive hoses, spark plug boots, and similar engine compartment rubber components. Typically a blend of the uncrosslinked (i.e., unvulcanized gum rubber) copolymer and diamine curing agent along with various fillers and other additives is subjected to a press-curing step at sufficient time, temperature and pressure to achieve covalent chemical bonding and crosslinking. Commercially, the practiced curing agent for AEM elastomer production is hexamethylene diamine carbamate (HMDAC).

The novel process according to the instant invention involves the use of an aqueous solution of hexamethylene diamine (HMDA) as the curing agent. It has now been discovered that an aqueous solution of HMDA can be employed either directly as a curative agent or employed to make a HMDA concentrate by depositions on an additive substrate.

Contrary to what may be expected, commercially available aqueous blends of HMDA and water (typically at a 70/30 weight ratio) can be employed as a direct substitute for HMDAC with a net effect of adding only about 0.5 pph (parts per hundred) of water to the resulting elastomer, essentially without affecting the critical properties of the elastomer.

The advantages and benefits of such an improved process for curing ethylene acrylate (AEM) and polyacrylate (ACM) elastomers are considered significant. An aqueous solution of HMDA represents a far more economical alternative relative to the use of HMDAC. Also, HMDA is preferably employed in an aqueous solution rather than as a solid because as a pure solid it is a corrosive material with a melt/freeze point of 40° C.

The aqueous solution of HMDA employed in the improved process of the instant invention can generally be any such solution provided that sufficient HMDA is employed to achieve the desired crosslinking and the quantity of water does not influence the final properties of the elastomer. Preferably, a concentrated solution of HMDA is employed wherein the HMDA is the major component. Conveniently a commercially available solution of typically 70/30 weight ratio HMDA/H$_2$O is employed.

Optionally, the aqueous solution of HMDA can be mixed or deposited onto one or more fillers or additives thus forming a concentrate. This concentrate can then be conveniently employed as the curing agent source during the manufacture of the elastomer by blending the copolymer to be cured with the concentrate.

For purposes of this invention the phrase "a monoalkyl ester of a 1,4-butene-dioic acid cure-site termonomer" refers to and includes any unsaturated dicarboxylic acid or derivative thereof that after polymerization results in contributing a succinic acid type moiety along the backbone of the terpolymer which can ultimately be monoesterified. As such, the monoalkyl esters of maleic acid and fumaric acid are preferred. The most preferred monomers are monomethyl maleic acid and monoethyl maleic acid. The above phrase also includes the homologs of maelic acid such as itaconic and mesaconic acid monoalkyl esters.

For purposes of the present invention an amide modification of the cure-site monomer such as described in U.S. Pat. No. 4,412,043 (herein incorporated by reference) is to be considered equivalent to the monoalkyl ester of a 1,4-butene-dioic acid cure-site termonomer. As such vulcanizable elastomeric copolymers comprising an ethylene/methyl or ethyl (meth) acrylate/4-(dialkylamino)-4-oxo-2-butenoic acid copolymer and/or methyl or ethyl(meth) acrylate copolymer with 4-(dialkylamino)-4-oxo- 2-butinoic acid termonomer and elastomeric compositions containing the same are felt to be amenable to the benefits associated with the process of the instant invention.

Preparation of the copolymers or manufacture of AEM elastomer of the present invention will be conducted as disclosed by Greene et al. for the preparation of ethylene/acrylate/1,4-butenedioic acid ester terpolymer in U.S. Pat. Nos. 3,883,472 and 3,908,588 and cited references therein, all hereby incorporated herein by reference. In particular, the copolymerization can be carried out in a pressure reactor at temperatures ranging from 90° to 250° C., preferably 130° to 180° C., and pressures ranging from 1600 to 2200 atmospheres (160 to 220 MPa), preferably 1800 to 2100 atmospheres (182 to 210 MPa). The polymerization will be run as a continuous process wherein the total conversion of monomers to polymer is 5 to 18 weight percent, preferably 10 to 16 weight percent. Unreacted monomer may be recirculated. The melt index of the terpolymers of the present invention will range from 0.1 to 50 dg/min., preferably 0.5 to 20 dg/min. Similarly, the preparation of the copolymers for manufacture of ACM elastomer of the present invention will be conducted as disclosed by Greene in U.S. Pat. No. 4,026,851 and cited references therein (all hereby incorporated herein by reference), provided that the cure-site 1,4-butenedioic acid ester termonomer be present.

The alkyl acrylates useful in their preparation typically are selected from methyl acrylate and ethyl acrylate when ethylene is a comonomer (i.e., AEM elastomer). In such cases the methyl acrylate is preferred and comprises from about 40 to 75 weight percent of the terpolymer, preferably from 50 to 70 weight percent. The monoalkyl ester of 1,4-butene-dioic acid function as the cure-site monomer and comprises from about 0.5 to 10.0 weight percent of the terpolymer. In the AEM type elastomer the ratio of comonomers can be selected to influence the final properties. Thus good low temperature properties are derived from the non-polar ethylene monomer, while the polar methyl acrylate monomer provides the oil and fluid resistance. Similarly the relative amount of cure-site monomer influences the degree of crosslinking and resulting rheological and mechanical properties. Similarly, in the case of the poly alkyl acrylate polymer system (i.e., ACM elastomer) the alkyl acrylates usually employed are methyl or ethyl acrylate, n-butyl acrylate and 2-methoxy ethyl acrylate along with 1,4-butene dioic acid ester cure-site monomer. Again, the respective relative amounts of each can be selected such as to influence the properties of the resulting elastomer as generally known in the art.

The terpolymers of the present invention can also be compounded in non-black formulations and vulcanized in the presence of peroxide curing systems such as discussed by Greene in U.S. Pat. No. 3,904,588. In such systems, the polymers possess the added advantage of improved tensile properties.

The vulcanizates of the present invention may also contain an antioxidant system based on a phosphorus ester antioxidant, a hindered phenolic antioxidant, an amine antioxidant, or a mixture of two or more of these compounds. The phosphorus ester compound can be, for example: tri (mixed mono- and dinonylphenyl) phosphite, tris(3,5-di-t-butyl-4-hydroxyphenyl) phosphate, high molecular weight poly(phenolic phosphonates), and 6-(3,5-di-t-butyl-4-hydroxy)benzyl-6H-dibenz[c,e][1,2]oxaphosphorin-6-oxide.

The hindered phenolic compounds include, for example, the following: 4,4'-butylidenebis(6-t-butyl-m-cresol), 1,3,5-trimethyl-2,4,6-tris-(3,5-di-t-butyl-4-hydroxybenzyl) benzene, 2,6-di-t-butyl-dimethylamino-p-cresol, and 4,4'-thio-bis-(3-methyl-6-t-butyl-phenol).

Suitable amine antioxidants include, among others, the following: polymerized 2,2,4-trimethyl-1,2-dihydroquinoline; N-phenyl-N'-(p-toluenesulfonyl)-p-phenylenediamine; N,N'-di(β-naphthyl) p-phenylene diamine; low temperature reaction product of phenyl (β-naphthyl) amine and acetone; and 4,4'-bis(α, α-dimethylbenzyl)-diphenylamine.

The proportion of the antioxidant compound in the vulcanizing composition is 0.1 to 5 parts per 100 parts of polymer, the preferred proportion being 0.5 to 2.5.

The antioxidant improves the heat aging of the compositions. The antioxidant effect is usually quite low below the preferred range and impractically low below the broad range recited above. Above the higher limits, little additional improvement is observed, and there may be adverse effects on the state of cure.

It is often desirable to add fillers to reduce cost and to improve mechanical properties. A typical vulcanized composition will usually contain about 10 to 40 volume percent of fillers, for example, carbon black, barium sulfate, magnesium silicate, or silica. Other conventional fillers can also be used. The preferred proportion of the fillers is 15 to 25 volume percent, and also depends on the reinforcing effect of the individual fillers. Below the lower limit, the improvement of tensile properties is quite low, while above the upper limit, the viscosity of the compound is too high and the hardness of the cured compound is too high. Also the percent elongation may be too low.

The ingredients of the vulcanizable composition can be mixed in conventional equipment, such as a two-roll mill or a Banbury mixer. The vulcanizate may be formed and press-cured using conventional procedures at about 170° to 210° C. for about 3 to 60 minutes.

The amount of aqueous HMDA solution used in this vulcanization process is about 0.06 to 0.30 mole of amino function per kilogram of polymer, preferably 0.12 to 0.22 mole per kilogram. Below the lower limit, the polymer tends to be undercured; while above the upper limit, the polymer tends to have impractical low elongation and poor heat aging resistance. It is to be noted that the aqueous HMDA solution can include various branched isomers and homologs of HMDA, provided they too are water soluble. The vulcanization can also include various vulcanization accelerators belonging to the following classes:
1. alkali metal salts of weak inorganic acids and alkali metal hydroxides;
2. alkali metal salts of weak organic acids, alkali metal alcoholates and phenolates;
3. quaternary ammonium and quaternary phosphonium hydroxides, alcoholates, phenolates, halides, and salts with weak acids;
4. tertiary amines;
5. guanidine, aryl- and alkylguanidines; and
6. heterocyclic, tertiary amines.

Examples of class (1) accelerators include sodium, potassium, and lithium hydroxides, phosphates, carbonates, bicarbonates, borates, hydrogen phosphates, and dihydrogen phosphates. The preferred accelerator is sodium hydroxide. The amount of a class (1) accelerator is 0.02 to 0.2 mole per kilogram of polymer; the preferred amount is 0.06 to 0.10 mole per kilogram.

Representative class (2) accelerators are sodium methoxide, potassium stearate, sodium and potassium isopropoxides, potassium laurate, sodium or potassium phenoxides, benzoates, or salts of lower aliphatic acids, e.g., acetates, and formates. The preferred accelerator is potassium stearate. About 0.02 to 0.2 mole of the accelerator per kilogram of polymer is be used, the range of 0.06 to 0.10 mole per kilogram being preferred.

Class (3) accelerators include, for example, tetrabutylammonium hydroxide, $(C_8H_{17}$—$C_{10}H_{21})_3(CH_3)NCl$ (sold under the trade name, Aliquat 336, by General Mills, Chemical Div., Kankakee, Ill.), benzyltriphenylphosphonium chloride, tetrabutylammonium methoxide, and tetrabutylammonium stearate. The preferred compounds are tetrabutylammonium hydroxide and $(C_8H_{17}$—$C_{10}H_{21})_3(CH_3)NCl$. These accelerators are used at a level of 0.01 to 0.1 mole per kilogram of polymer, preferably 0.02 to 0.05 mole per kilogram of polymer.

Tertiary amines representative of class (4) accelerators include triethylenediamine, N,N,N',N'-tetramethyl-1,4-butanediamine, N,N,N',N'-tetramethyl-2,6-diaminophenol, and N,N-dimethylaminoethanol. Triethylenediamine is the preferred accelerator in this class. About 0.01 to 0.1 mole of accelerator of this class per kilogram of polymer is used, the range of 0.02–0.05 mole per kilogram being preferred.

Representative class (5) accelerators include tetramethylguanidine, tetraethylguanidine diphenylguanidine and di-ortho-tolyl guanidine. The level of application of class (5) accelerators is 0.01 to 0.12 mole per kilogram of polymer, preferably 0.02 to 0.09 mole per kilogram. The preffered accelerators are diphenylguanidine and di-ortho-tolyl guanidine Typical class (6) accelerators include imidazole, pyridine, quinoline, and N-phenylmorpholine. The preferred amine of this class is imidazole. Class (6) accelerators are used in amounts of 0.02 to 0.09 moles per kilogram of polymer.

Two or more accelerators as defined herein may be used.

The preferred accelerators are those of classes (4) and (5), above, because they have the minimum effect on compound scorch (premature curing at low temperature) and on the heat resistance of the vulcanizates.

The following examples are presented to more fully demonstrate and further illustrate various aspects and features of the present invention. As such, the showings are intended to further illustrate the differences and advantages of the present invention but are not meant to be unduly limiting.

EXAMPLE 1

For comparative evaluation a series of four different blends was prepared and tested. In each respective run a commercial grade of a random ethylene/methyl acrylate copolymer (41% by weight ethylene and 55% methyl acrylate) having 4 weight % methyl hydrogen maleate termonomer present as the cure-site monomer (sold under the tradename Vamac® by E. I. du Pont de Nemours and Company) was employed. Runs 1 and 3 employed 1.5 parts per weight HMDAC per 100 parts of the Vamac terpolymer as the curative agent. Runs 2 and 4 employed 1.55 parts by weight HMDA in the form of a 70/30 HMDA/water solution (pH≈12) as the curative agent. The 1.5 pph HMDAC and 1.55 pph of the 70/30 HMDA/H₂O used the same molar amount of curative. Runs 1 and 2 also employed the standard level of 4 parts by weight per 100 parts of Vamac® of di-ortho-tolyl guanidine (DOTG) which is the accelerator for the cure while runs 3 and 4 did not use DOTG as the accelerator. Each run further included 60 parts by weight carbon black along with antioxidants and other additives. Details of the respective compositions and resulting data are presented in Table 1.

The respective starting ingredients were blended on an OCC Banbury mixer using an upside down mix procedure and a dump temperature of 100° C. followed by further mixing on a two-roll mill at about 25° C. to achieve a homogeneous mixture. Vulcanized slabs of 75 mils (0.075 inch or 1.9 mm) inch thick were prepared by press-curing the blended mixtures for 5 minutes at 175° C. at a pressure of about 1,100 psig. The vulcanizates were then post-cured at 175° C. for four hours at ambient pressure.

As seen in the data, the rheology of compounds 1 and 2 and the cured physicals for compounds 1 and 2 are essentially the same.

Also the rheology of compounds 3 and 4 and the cured physicals for compounds 3 and 4 are essentially the same. DOTG makes significant improvements in the cure rate and the physical properties of the conventional HMDAC cure. The HMDA/H₂O cure also benefits from using DOTG as an accelerator.

TABLE 1

Properties of Compounds made with HMDA/H₂O and also with and without DOTG

| | Run Number | | | |
|---|---|---|---|---|
| | 1 | 2 | 3 | 4 |
| Vamac | 100 | 100 | 100 | 100 |
| Carbon Black, N550 | 60 | 60 | 60 | 60 |
| TP-759 | 10 | 10 | 10 | 10 |
| Stearic Acid | 1.5 | 1.5 | 1.5 | 1.5 |
| Vanfre VAM | 1 | 1 | 1 | 1 |
| Armeen 18D | 0.5 | 0.5 | 0.5 | 0.5 |
| Naugard 445 | 2 | 2 | 2 | 2 |
| Diak #1 | 1.5 | | 1.5 | |
| 70 HMDA/30 H₂O | | 1.55 | | 1.55 |
| DOTG | 4 | 4 | 0 | 0 |
| Total PPH | 180.5 | 180.55 | 176.5 | 176.55 |
| Rheology of Compounds Mooney Viscosity | | | | |
| ML(1 + 4) @ 100° C. | 36 | 36 | 43 | 43 |
| Mooney Scorch - 121° C. | | | | |
| Minimum Viscosity - MU | 13.2 | 13.1 | 15.5 | 15.4 |
| t10 - metricminutes | 12.8 | 13.1 | 14.9 | 15.4 |
| t18 - metricminutes | 18.8 | 19.7 | | |
| MDR summary at 177, 1° arc | | | | |
| ML, lbf-in | 0.56 | 0.56 | 0.68 | 0.67 |
| MH, lbf-in | 22.1 | 23.1 | 14 | 13.6 |
| TS2, metric minutes | 0.85 | 0.84 | 1.35 | 1.36 |
| t50, m minutes | 2.4 | 2.5 | 4.1 | 4.1 |
| t90, m minutes | 10.1 | 10.9 | 16.7 | 16.8 |
| Physical properties after cure | | | | |

5 min in Press cure at 175° C.
4 Hours of Post cure at

TABLE 1-continued

Properties of Compounds made with HMDA/H₂O and also with and without DOTG

| | Run Number | | | |
|---|---|---|---|---|
| | 1 | 2 | 3 | 4 |
| 175° C. | | | | |
| Hardness Shore A | 65 | 64 | 67 | 66 |
| Modulus at 100% | 775 | 860 | 725 | 722 |
| Elongation psi | | | | |
| Tensile Strength, psi | 2322 | 2442 | 2343 | 2342 |
| % Elongation | 314 | 293 | 289 | 293 |
| Compression set 168 hrs/150° C. | 23.5 | 22.3 | 44.9 | 48.2 |
| Age 1 week at 175 C. in air | | | | |
| Hardness Shore A | 69 | 75 | 70 | 66 |
| Modulus at 100% elongation psi | 893 | 975 | 694 | 636 |
| Tensile strength psi | 2371 | 2223 | 1882 | 1841 |
| % Elongation | 280 | 270 | 288 | 290 |
| Change in Hardness, points | 4 | 11 | 3 | 0 |
| % change in 100% modulus | 15.2% | 13.4% | −4.3% | −11.9% |
| % change in tensile | 2.1% | −9.0% | −19.7% | −21.4% |
| % change in elongation | −10.8% | −7.8% | −0.3% | −1.0% |
| Age 6 weeks at 150° C. in air | | | | |
| Hardness Shore A | 69 | 73 | 69 | 68 |
| Modulus at 100% elongation psi | 884 | 936 | 802 | 740 |
| Tensile strength psi | 2168 | 2091 | 1937 | 1884 |
| % Elongation | 277 | 298 | 304 | 316 |
| Change in Hardness, points | 4 | 9 | 2 | 2 |
| % change in 100% modulus | 14.1% | 8.8% | 10.6% | 2.5% |
| % change in tensile | −6.6% | −14.4% | −17.3% | −19.6% |
| % change in elongation | −11.8% | 1.7% | 5.2% | 7.8% |

EXAMPLE 2

In a manner analogous to that of Example 1, a series of six additional runs was performed and tested. Run 1 is the control. Runs 2 and 3 use a silica carrier for the HMDA/H₂O solution. Runs 4 and 5 use carbon black as the carrier for the HMDA/H₂O solution. Run 6 uses DOTG as the carrier.

The concentrates were prepared by blending the HMDA/H₂O solution with the dry silica, carbon black or DOTG. They were mixed in a beaker with a stirring rod. The silica compounds were still free flowing compounds after the addition of the HMDA/H₂O and were very easy to add to the Banbury. The carbon black mixture used in run 4 (2 to 1 ratio of black to HMDA/H₂O) was relatively easy to add to the Banbury. However, the carbon black mixture used in run 5 (1 to 1 ratio of black to HMDA/H₂O was difficult to add to the mixture because it was a "pasty" consistency. The concentrate used in run 6 was a blend of 4 parts of DOTG and 1.55 parts of HMDA/H₂O (standard cure level). This concentrate was also "pasty" and difficult to feed to the Banbury. The resulting data are presented in Table 2.

TABLE 2

Properties of Compounds made with HMDA/H$_2$0 Deposited on Additive Before Blending With Polymer

|  | Run Number | | | | | |
| --- | --- | --- | --- | --- | --- | --- |
|  | 1 | 2 | 3 | 4 | 5 | 6 |
| Vamac | 100 | 100 | 100 | 100 | 100 | 100 |
| Black, N550 | 60 | 56.85 | 58.45 | 56.85 | 58.45 | 60 |
| TP-759 | 10 | 10 | 10 | 10 | 10 | 10 |
| Stearic Acid | 1.5 | 1.5 | 1.5 | 1.5 | 1.5 | 1.5 |
| Vanfre VAM | 1 | 1 | 1 | 1 | 1 | 1 |
| Armeen 18D | 0.5 | 0.5 | 0.5 | 0.5 | 0.5 | 0.5 |
| Naugard 445 | 2 | 2 | 2 | 2 | 2 | 2 |
| Diak #1 | 1.5 | | | | | |
| 33 HMDA/H2O, 67 Silica (A) | | 4.7 | | | | |
| 50 HMDA/H2O, 50 Silica (B) | | | 3.1 | | | |
| 33 HMDA/H2O, 67 Black (C) | | | | 4.7 | | |
| 50 HMDA/H2O, 50 Black (D) | | | | | 3.1 | |
| 27.9 HMDA/H2O, 72.1 DOTG (E) | | | | | | 5.55 |
| DOTG | 4 | 4 | 4 | 4 | 4 | 0 |
| Total PPH | 180.5 | 180.55 | 180.55 | 180.55 | 180.55 | 180.55 |
| Rheology of Compounds | | | | | | |
| Viscosity, ML (1 + 4) @ 100° C. | 35.2 | 35.2 | 34.5 | 33.4 | 34.8 | 31.5 |
| Mooney Scorch - 121° C. | | | | | | |
| Minimum Viscosity - MU | 11.8 | 12.2 | 11.6 | 11.4 | 11.3 | 10.7 |
| t3 - metric minutes | 7.7 | 7.7 | 7.8 | 7.9 | 7.9 | 7.7 |
| t10 - metric minutes | 12.8 | 13.1 | 13.3 | 13.4 | 13.3 | 13.1 |
| t18 - metric minutes | 18.8 | 20.3 | 20.3 | 19.8 | 20.2 | 18.8 |
| MDR summary at 177, 1° arc | | | | | | |
| ML, lbf-in | 0.52 | 0.54 | 0.52 | 0.51 | 0.54 | 0.51 |
| MH, lbf-in | 22.1 | 23.1 | 23.5 | 21.3 | 24.2 | 20.5 |
| tS1, metric minutes | 0.65 | 0.64 | 0.65 | 0.65 | 0.66 | 0.64 |
| tS2, metric minutes | 0.85 | 0.84 | 0.86 | 0.86 | 0.86 | 0.84 |
| t10, m minutes | 0.88 | 0.88 | 0.91 | 0.91 | 0.93 | 0.84 |
| t50, m minutes | 2.4 | 2.5 | 2.6 | 2.6 | 2.7 | 2.3 |
| t90, m minutes | 9.3 | 11.5 | 11.2 | 10.7 | 11 | 10.2 |
| Slope, (0.9*MH-ML + 2)/(t90-tS2) | 2.53 | 2.09 | 2.19 | 2.10 | 2.29 | 2.13 |
| Slope, (0.5*MH-ML + 2)/(t50-tS2) | 13.8 | 13.4 | 13.0 | 11.9 | 12.6 | 13.7 |
| Physical properties after cure | | | | | | |
| 5 min in Press cure at 175° C. | | | | | | |
| 4 Hours of Post cure at 175° C. | | | | | | |
| Hardness, Shore A | 67 | 66 | 67 | 69 | 68 | 67 |
| Modulus at 100% Elongation, psi | 826 | 813 | 869 | 877 | 893 | 748 |
| Tensile Strength, psi | 2293 | 2323 | 2421 | 2397 | 2439 | 2385 |
| % Elongation | 294 | 286 | 281 | 276 | 279 | 319 |
| Die C tear, pli | 204 | 207 | 210 | 203 | 186 | 195 |
| Compression set 168 hrs/150° C. | 20.3 | 21.1 | 19.1 | 17.4 | 20.9 | 20.4 |

EXAMPLE 3

In a manner analogous to and using the same procedures of Example 1, a series of five additional blends using two different polyacrylate (ACM) type elastomers (i.e., AR-12 and AR-14, commercially available from Zeon Corporation, Japan) known to be cross-linkable with the HMDAC/DOTG cure system was prepared and tested. Run 1 was performed using HMDAC/DOTG curative system and runs 2 and 4 used HMDA/water plus DOTG curative system and run 5 HMDA/water deposited/dispersed on precipitated silica plus DOTG. Run 3 did not employ a diamine curative agent. The resulting data presented in Table 3 establish that the aqueous HMDA curative agent of the instant invention is operative for polyacrylate (ACM) type elastomers.

TABLE 3

Properties of Compounds made with HMDA/H$_2$0 and/or HMDA/H$_2$0 Deposited on Additive Before Blending With Polyacrylate (ACM) Polymer

| | RUN NUMBER | | | | |
|---|---|---|---|---|---|
| | 1 | 2 | 3 | 4 | 5 |
| AR 12 | 100 | 100 | | | 100 |
| AR 14 | | | 100 | 100 | |
| Carbon Black, N550 | 55 | 55 | 55 | 55 | 55 |
| Stearic Acid | 1 | 1 | 1 | 1 | 1 |
| Vanfre VAM | 0.5 | 0.5 | 0.5 | 0.5 | 0.5 |
| Armeen 18D | 0.5 | 0.5 | 0.5 | 0.5 | 0.5 |
| Naugard 445 | 2 | 2 | 2 | 2 | 2 |
| Struktol WB 222 | 2 | 2 | 2 | 2 | 2 |
| Diak #1 | 0.6 | | 0.0 | | |
| 70 HMDA/30 H2O Concentrate* | | 0.62 | | 0.62 | |
| | | | | | 0.96 |
| DOTG | 2 | 2 | 2 | 2 | 2 |
| Total PHR | 163.6 | 163.62 | 163.0 | 163.62 | 163.96 |
| Rheology of Compounds Mooney Viscosity | | | | | |
| ML (1 + 4) @ 100° C. | 46.6 | 45.5 | 38.7 | 46.2 | 46.3 |
| Mooney Scorch - 121° C. | | | | | |
| Initial Visc - MU - 1 min preheat | 27.8 | 27 | 24.5 | 26.2 | 26.5 |
| Minimum Viscosity - MU | 22.8 | 21.7 | 18.2 | 23.2 | 21.7 |
| t3 - metric minutes | 6.76 | 7.01 | | 4.43 | 6.75 |
| t10 - metric minutes | 9 | 9.43 | | 6.07 | 9.23 |
| t18 - metric minutes | 10.2 | 10.6 | | 7.27 | 10.58 |
| MDR summary at 177, 1° arc 30 minutes | | | | | |
| ML, lbf-in | 2.26 | 2.28 | 2.19 | 2.6 | 2.28 |
| MH, lbf-in | 15 | 15.4 | | 13.4 | 15 |
| tS1, metric minutes | 0.48 | 0.46 | | 0.53 | 0.47 |
| tS2, metric minutes | 0.64 | 0.62 | | 0.83 | 0.63 |
| t10, m minutes | 0.52 | 0.51 | | 0.55 | 0.51 |
| t50, m minutes | 1.72 | 1.7 | | 2.91 | 1.68 |
| t90, m minutes | 8.32 | 8.62 | | 14.4 | 8.54 |
| Slope, (0.9*MH-(ML + 2))/(t90-tS2) | 1.20 | 1.20 | | 0.55 | 1.17 |
| Slope, (0.5*MH-(ML + 2))/(t50-tS2) | 3.0 | 3.2 | | 1.0 | 3.1 |
| Physical properties after cure | | | | | |
| 5 min in Press cure at 175° C. | | | | | |
| 4 Hours of Post cure at 175° C. | | | | | |
| Hardness | 61.5 | 59.9 | 34.5 | 61.3 | 59.6 |
| Modulus at 100% Elongation | 498 | 544 | 52 | 861 | 549 |
| Tensile Strength, psi | 1461 | 1516 | | 1423 | 1395 |
| % Elongation | 232 | 219 | | 138 | 209 |
| Die C tear, pli | 106 | 101 | 31 | 73 | 113 |
| Compression set 168 hrs/150° C. | 12.8 | 12.4 | 90.7 | 21.5 | 14.6 |

*Concentrate is 65% of 70/30 HMDA/H2O and 35% precipitated silica

Having thus described and exemplified the invention with a certain degree of particularity, it should be appreciated that the following claims are not to be so limited but are to be afforded a scope commensurate with the wording of each element of the claim and equivalents thereof.

I claim:

1. A process for making a crosslinked ethylene acrylate elastomer or a polyacrylate elastomer comprising producing an aqueous solution comprising hexamethylene diamine; blending the aqueous solution with a particulate filler under a condition that the solution deposited onto the filler to produce a dry liquid concentrate; contacting the concentrate with a copolymer to produce a mixture comprising about 0.06 to about 0.3 mole of amino function per kilogram of the copolymer; and heating the mixture wherein the copolymer is an ethylene/alkyl acrylate copolymer or a polyacrylate each containing a monoalkyl ester of a 1,4-butene-dioic acid cure-site termonomer and the filler is an inorganic material.

2. A process according to claim 1 wherein said aqueous solution comprises 70 weight % hexamethylene diamine and 30 weight % water and the concentrate is free flowing.

3. A process according to claim 2 wherein said filler is carbon black, fumed silica, or silica.

4. A free flowing curative concentrate for crosslinking an ethylene/alkyl acrylate copolymer containing a monoalkyl ester of a 1,4-butene-dioic acid cure-site termonomer or a polyacrylate copolymer containing a monoalkyl ester of a 1,4-butene-dioic acid cure-site termonomer comprising an aqueous solution of hexamethylene diamine deposited on at least one particulate filler selected from the group consisting of silica fumed silica, precipitated silica and inorganic mineral wherein the aqueous solution comprises 70% hexamethylene diamine and 30% water.

5. A process according to claim 1 wherein the mixture comprises 0.12 to 0.22 mole of amino function per kilogram of the copolymer.

6. A process comprising producing an aqueous solution comprising 70 weight % hexamethylene diamine and 30 weight % water; combining the aqueous solution with a particulate filler to deposit the hexamethylene diamine onto the filler to produce a dry liquid concentrate; combining the dry liquid concentrate with a copolymer to produce a mixture comprising about 0.06 to about 0.3 mole of amino function per kilogram of the copolymer; and heating the mixture wherein the filler is carbon black, fumed silica, precipitated silica, inorganic mineral, or combinations of two or more thereof and the copolymer is an ethylene/alkyl acrylate copolymer or a polyacrylate.

7. A process according to claim 1 wherein the mixture further comprises an accelerator selected from the group consisting of alkali metal salt of inorganic acid, alkali metal hydroxide, alkali metal salt of organic acid, alkali metal alcoholate, alkali metal phenolate, quaternary ammonium and quaternary phosphonium hydroxide, quaternary ammonium and quaternary alcoholate, quaternary ammonium and quaternary phenolate, quaternary ammonium and quaternary halide, quaternary ammonium and quaternary salts of weak acid, tertiary amine, guanidine, aryl- or alkylguanidine, and combinations of two or more thereof.

8. A process according to claim 6 wherein the mixture further comprises an accelerator selected from the group consisting of alkali metal salt of inorganic acid, alkali metal hydroxide, alkali metal salt of organic acid, alkali metal alcoholate, alkali metal phenolate, quaternary ammonium and quaternary phosphonium hydroxide, quaternary ammonium and quaternary alcoholate, quaternary ammonium and quaternary phenolate, quaternary ammonium and quaternary halide, quaternary ammonium and quaternary salts of weak acid, tertiary amine, guanidine, aryl- or alkylguanidine, and combinations of two or more thereof.

9. A process according to claim 7 wherein the accelerator is triethylenediamine, N,N,N',N'-tetramethyl-1,4-butanediamine, N,N,N',N'-tetramethyl-2,6-diaminophenol, N,N-dimethylaminoethanol, tetramethylguanidine, tetraethylguanidine diphenylguanidine, di-ortho-tolyl guanidine, and combinations of two or more thereof.

10. A process according to claim 8 wherein the accelerator is triethylenediamine, N,N,N',N'-tetramethyl-1,4-butanediamine, N,N,N',N'-tetramethyl-2,6-diaminophenol, N,N-dimethylaminoethanol, tetramethylguanidine, tetraethylguanidine diphenylguanidine, di-ortho-tolyl guanidine, and combinations of two or more thereof.

11. A process according to claim 7 wherein the accelerator is tetramethylguanidine, tetraethylguanidine, diphenylguanidine, di-ortho-tolyl guanidine, or combinations of two or more thereof.

12. A process according to claim 8 wherein the accelerator is tetramethylguanidine, tetraethylguanidine, diphenylguanidine, di-ortho-tolyl guanidine, or combinations of two or more thereof.

13. A process according to claim 7 wherein the accelerator is diphenylguanidine, di-ortho-tolyl guanidine, or both.

14. A process according to claim 8 wherein the accelerator is diphenylguanidine, di-ortho-tolyl guanidine, or both.

15. A process according to claim 7 wherein the accelerator is triethylenediamine.

16. A process according to claim 8 wherein the accelerator is triethylenediamine.

17. A process according to claim 3 wherein the mixture further comprises an accelerator selected from the group consisting of alkali metal salt of inorganic acid, alkali metal hydroxide, alkali metal salt of organic acid, alkali metal alcoholate, alkali metal phenolate, quaternary ammonium and quaternary phosphonium hydroxide, quaternary ammonium and quaternary alcoholate, quaternary ammonium and quaternary phenolate, quaternary ammonium and quaternary halide, quaternary ammonium and quaternary salts of weak acid, tertiary amine, guanidine, aryl- or alkylguanidine, and combinations of two or more thereof.

18. A process according to claim 17 wherein the accelerator is tetramethylguanidine, tetraethylguanidine, diphenylguanidine, di-ortho-tolyl guanidine, or combinations of two or more thereof.

19. A process according to claim 17 wherein the accelerator is diphenylguanidine, di-ortho-tolyl guanidine, or both.

* * * * *